United States Patent
Penfold et al.

(10) Patent No.: US 12,253,934 B2
(45) Date of Patent: Mar. 18, 2025

(54) CODE COVERAGE MEASUREMENT FOR TEST SYSTEMS

(71) Applicant: INTERNATIONAL BUSINESS MACHINES CORPORATION, Armonk, NY (US)

(72) Inventors: Colin R. Penfold, Ropley (GB); Darren R. Beard, Chandlers Ford (GB); Michael John Fish, Eastleigh (GB); Jeremy Weaving, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/453,494

(22) Filed: Nov. 4, 2021

(65) Prior Publication Data

US 2023/0140267 A1    May 4, 2023

(51) Int. Cl.
*G06F 11/3668*    (2025.01)

(52) U.S. Cl.
CPC ...... *G06F 11/3676* (2013.01); *G06F 11/3688* (2013.01); *G06F 11/3696* (2013.01)

(58) Field of Classification Search
None
See application file for complete search history.

(56) References Cited

U.S. PATENT DOCUMENTS

| | | | |
|---|---|---|---|
| 5,673,387 A * | 9/1997 | Chen | G06F 11/3676 707/999.203 |
| 6,356,858 B1 | 3/2002 | Malka | |
| 6,728,955 B1 * | 4/2004 | Berry | G06F 11/3466 714/E11.2 |
| 7,506,315 B1 * | 3/2009 | Kabadiyski | G06F 11/3612 717/148 |
| 8,839,203 B2 | 9/2014 | Opstad | |
| 9,274,922 B2 * | 3/2016 | Masser | G06F 11/3692 |
| 10,146,668 B1 | 12/2018 | Chopra | |
| 2005/0278705 A1 * | 12/2005 | Castellanos | G06F 11/3636 717/128 |

(Continued)

FOREIGN PATENT DOCUMENTS

| | | |
|---|---|---|
| CN | 103914652 | 5/2018 |
| CN | 116069616 A | 5/2023 |
| JP | 2023070117 A | 5/2023 |

OTHER PUBLICATIONS

H. M. Sneed and C. Verhoef, "Measuring test coverage of SoA services," 2015 IEEE 9th International Symposium on the Maintenance and Evolution of Service-Oriented and Cloud-Based Environments (MESOCA), 2015, pp. 59-66, doi: 10.1109/ MESOCA.2015.7328128. (Year: 2015).*

(Continued)

*Primary Examiner* — Andrew M. Lyons
(74) *Attorney, Agent, or Firm* — Daniel J Blabolil

(57) ABSTRACT

A method and system are provided for code coverage for test systems for testing source code. The method obtains a trace with trace records written at entry and exit to one or more test modules for function calls to the test modules. The method compares response codes for the functions extracted from the trace with a finite list of response codes retrieved from metadata for the source code for the functions and analyzes a code coverage based on the comparison.

16 Claims, 6 Drawing Sheets

(56) References Cited

U.S. PATENT DOCUMENTS

| | | | |
|---|---|---|---|
| 2006/0015612 A1* | 1/2006 | Shimazaki | H04L 67/535 709/224 |
| 2006/0236156 A1* | 10/2006 | Cunningham | G06F 11/3676 714/38.1 |
| 2009/0249250 A1* | 10/2009 | Gajula | G06F 11/3688 715/810 |
| 2010/0262866 A1* | 10/2010 | Nir-Buchbinder | G06F 11/3676 714/38.1 |
| 2010/0313187 A1* | 12/2010 | Tan | G06F 11/3676 717/124 |
| 2011/0276834 A1* | 11/2011 | Calahan | G06F 11/3688 714/38.1 |
| 2014/0372988 A1* | 12/2014 | Fanning | G06F 8/75 717/131 |
| 2015/0301926 A1* | 10/2015 | Giannelos | G06F 3/0484 717/125 |
| 2016/0259714 A1 | 9/2016 | Shor | |
| 2018/0081791 A1* | 3/2018 | Alabes | G06F 11/3692 |
| 2018/0173610 A1 | 6/2018 | Lee | |
| 2018/0365125 A1* | 12/2018 | Mola | G06F 11/323 |
| 2020/0319992 A1* | 10/2020 | Masis | G06F 11/3608 |

OTHER PUBLICATIONS

A. Saha, R. Udava, M. Bidari, M. Prasad, V. Raju and T. Vrind, "TraFic—A Systematic Low Overhead Code Coverage Tool for Embedded Systems," 2021 IEEE International Conference on Electronics, Computing and Communication Technologies (CONECCT), Bangalore, India, Jun. 2021, pp. 1-6. (Year: 2021).*

Mell, et al., "The NIST Definition of Cloud Computing", National Institute of Standards and Technology, Special Publication 800-145, Sep. 2011, 7 pages.

\* cited by examiner

CODE COVERAGE MEASUREMENT FOR TEST SYSTEMS

BACKGROUND

The present invention relates to code coverage measurement, and more specifically, to code coverage measurement for test systems.

Test completeness is traditionally measured by using code coverage. Code coverage is a measure used to describe the degree to which the source code of a program is executed when a particular test suite runs.

A program with high test coverage has had more of its source code executed during testing. A high test coverage for a program suggests that there is a lower chance of the program containing undetected software bugs compared to a program with low test coverage. Many different metrics can be used to calculate test coverage; some of the most basic are the percentage of program subroutines and the percentage of program statements called during execution of the test suite.

Code coverage is typically done by instrumenting at a low level such as the machine instructions. This is reported at the module level and then aggregated up to a total value. Existing solutions focus on whether a code path has been executed, or whether it has been executed for certain external input criteria.

In reality, the problem is much more complex as the execution will depend on the values passed to various modules. These can lead to a large number of error flows which are not fully captured by the code coverage metric. For example, if a module performed various input validation and branched to code which set a bad return code and returned for each of these checks, it may be that only a small percentage of the code would be concerned with the return code setting and returning. Therefore, the module could have a very high coverage, but not necessarily actually have tested many of the possible error flows. This would have to be determined by looking at line by line coverage data.

SUMMARY

According to an aspect of the present invention there is provided a computer-implemented method for code coverage for test systems for testing source code, comprising: obtaining trace records written at entry and exit to one or more test modules for function calls to the test modules; comparing response codes for the functions extracted from the trace with a finite list of response codes retrieved from metadata for the source code for the functions; and analyzing a code coverage based on the comparison.

According to another aspect of the present invention there is provided a system for code coverage for test systems for testing source code, comprising: a processor and a memory configured to provide computer program instructions to the processor to execute the function of the components: a trace obtaining component for obtaining trace records written at entry and exit to one or more test modules for function calls to the test modules; a metadata comparing component for comparing response codes for the functions extracted from the trace with a finite list of response codes retrieved from metadata for the source code for the functions; and a code coverage analyzing component for analyzing a code coverage based on the comparison.

According to a further aspect of the present invention there is provided a computer program product for code coverage for test systems for testing source code, the computer program product comprising a computer readable storage medium having program instructions embodied therewith, the program instructions executable by a processor to cause the processor to: obtain trace records written at entry and exit to one or more test modules for function calls to the test modules; compare response codes for the functions extracted from the trace with a finite list of response codes retrieved from metadata for the source code for the functions; and analyze a code coverage based on the comparison.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and system are provided for analyzing code coverage during testing by using trace data based on input and output combinations rather than code path.

The source code may be tested by test modules and their inputs and outputs are traced. The inputs may include the functions that the test module has been called for and other possible inputs. Other possible inputs may include numerical values required by a function, for example, how much storage to allocate, or they may include other input parameters that a function may require. The outputs may include response codes that indicate that either the call is successful or the reason for the call failing. Each test module may call other test modules and therefore a trace has a form where each input trace is linked to an output trace.

The term "function" is used to describe a function or method that may be executed by being called and includes, as examples, an application programming interface (API) call, a Java method (Java is a trade mark of Oracle Corporation), or an IBM Customer Information Control System (CICS) function (IBM CICS is a trade mark of International Business Machines Corporation).

Metadata listing the inputs and outputs is retrieved for the functions being input. This includes the values of data items for function codes and response codes, which are a finite set. The metadata may be, for example, a documented list of functions for the source code, or may be obtained by a scan of the source code. Inputs have the potential to affect the code path of execution within a program; therefore, inputs are required in addition to the outputs.

The described method and system compare the trace response data to the metadata for functions executed by the test module to determine the coverage achieved by the test module.

Figure 1:
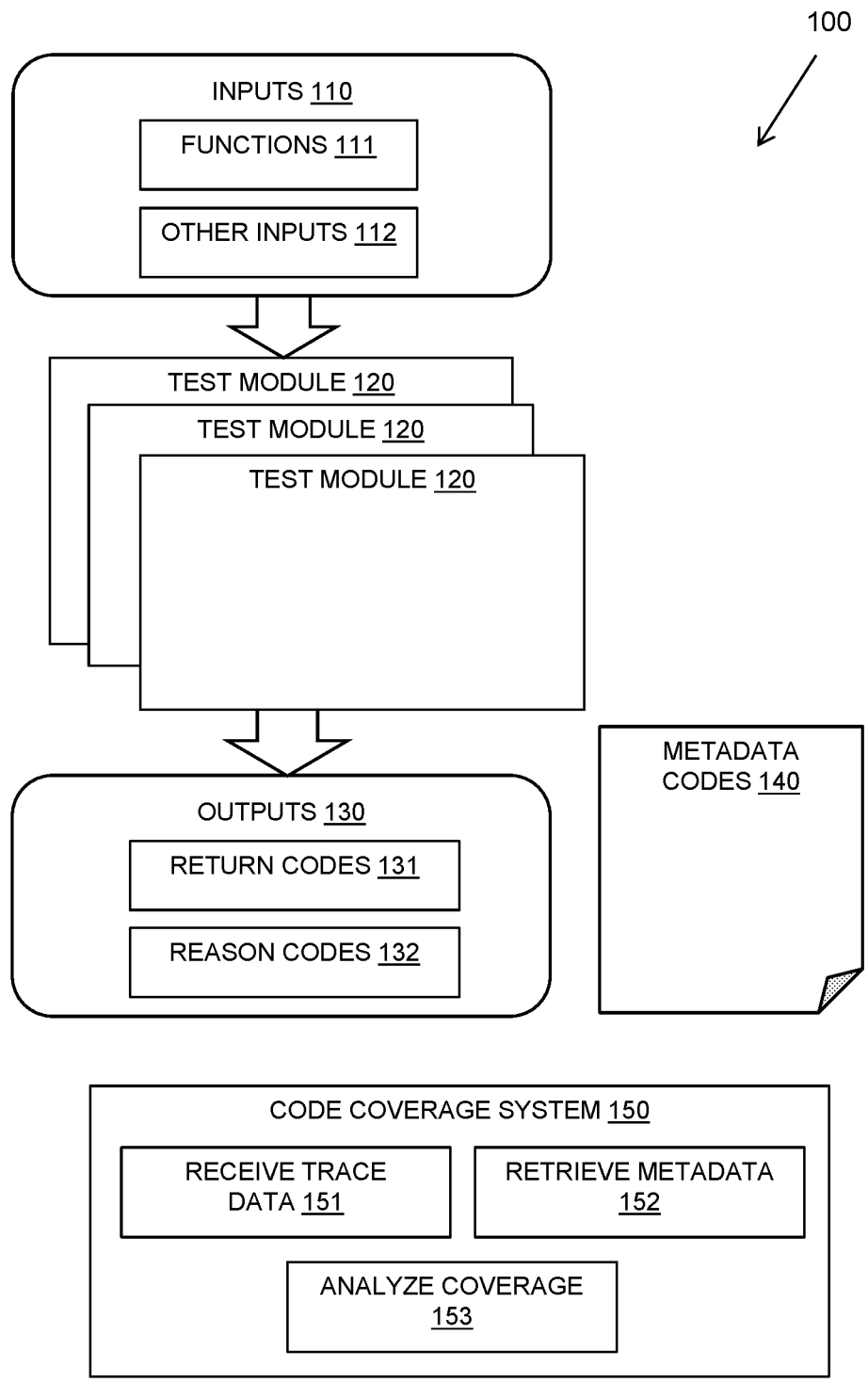
FIG. 1 is a schematic diagram of a method in accordance with the present invention.

Referring to FIG. 1, a schematic diagram 100 illustrates the described method and system. As part of a test system, inputs 110 are made in the form of function inputs 111 and other inputs 112 (for example, function parameters or values) to a test module 120 and outputs 130 are returned in the form of response codes such as return codes 131 and reason codes 132. The test module 120 may be an executable module to test calls of the source code. A test module 120 may call other test modules 120 as part of its execution and the outputs 130 may be from the resultant series of test modules 120.

Metadata codes 140 are provided as a finite list of all response codes, such as in the form of return codes and reason codes for functions. Return codes 131 may indicate a successful call and reason codes 132 may provide a reason for a failure of a call.

A code coverage system 150 as described herein receives trace data 151 of the inputs 110 and the outputs 130 for the functions executed by the one or more test modules 120. The code coverage system 150 also retrieves metadata 152 relating to the inputs 110 and outputs 130 in the form of a finite list of possible response codes for the functions executed by the test module(s) 120. The code coverage system 150 analyzes the coverage 153 of the test module(s) 120 by comparing the trace data 151 and the retrieved metadata codes 152.

Figure 2:
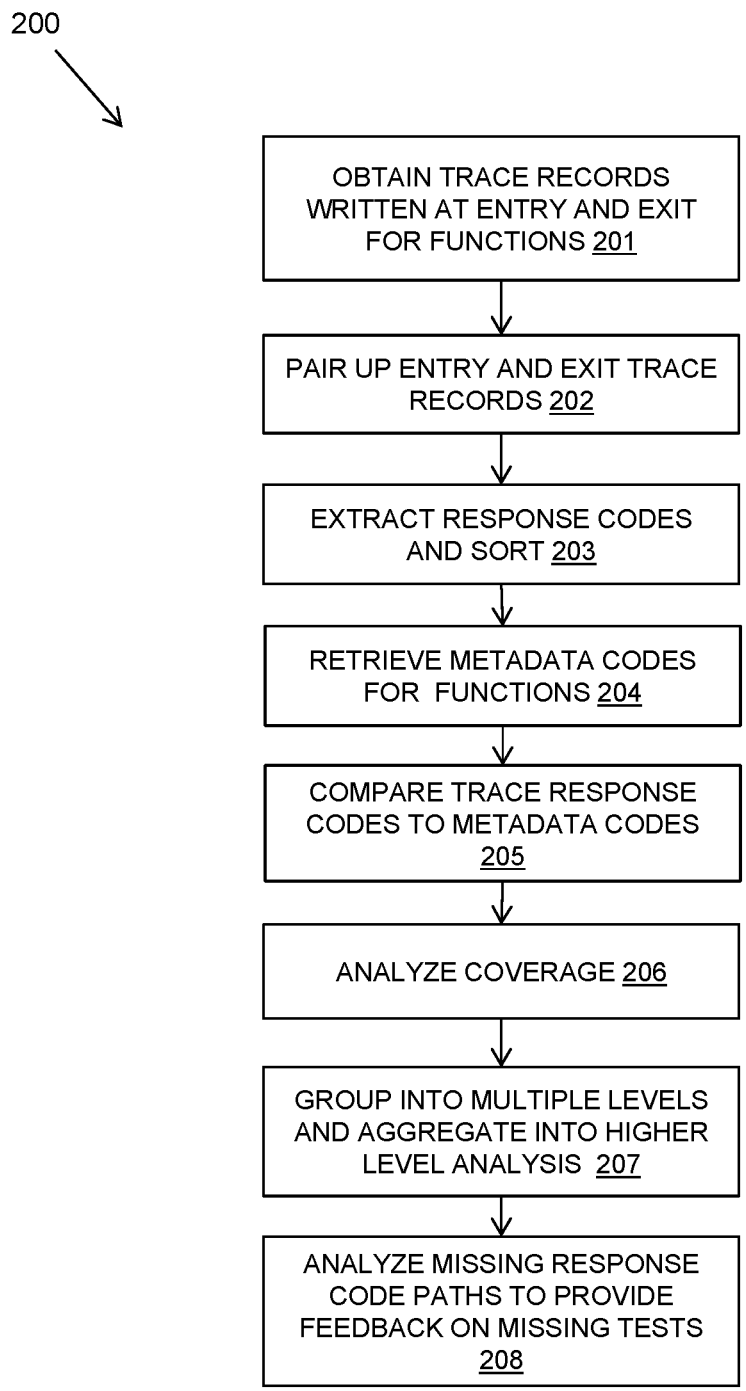
FIG. 2 is a flow diagram of an example embodiment of a method in accordance with the present invention.

Referring to FIG. 2, a flow diagram 200 shows an example embodiment of the described method of analyzing code coverage of source code in a test system.

The method may obtain 201 trace records written at entry and exit to one or more test modules for function calls to the test modules. This may include running a test to produce a trace with trace records written at entry and exit for the functions being executed. When a trace is run, it captures all input and output function calls for each test module. This may include collecting an input trace of modules for functions that the test modules have called and collecting an output trace of test modules including response codes of functions. The response codes may include successful return codes and reason codes for failed calls.

The entry and exit trace records are paired up 202 to produce a single record. Inputs to a function are provided by the entry trace record and outputs from the function are provided by an exit trace record and pairing the entry and exit trace records provides information about the code paths executed.

Response codes are extracted for the executed functions 203 and may be sorted including removing duplicates. A record may be created for each function using the input and output trace of each module with a list of the response codes found.

The method may retrieve 204 metadata codes of all response codes for each function in each test module that have been executed in the test. The method may compare 205 the record of trace records with the metadata codes for the functions to determine coverage.

The coverage of the functions is analyzed 206. The codes may be grouped 207 into multiple levels and comparison data from each level may be aggregated into the higher level.

In one embodiment, looking at a specific function and taking the simplest case of the combinations of function calls and response codes, the levels may be aggregated as follows. The coverage of a function may be determined as the percentage of possible response codes that appear in the trace compared with metadata of the finite list of the responses that the function can return. The coverage of a module may be determined in the same way but looking at all possible functions and all possible response codes for each function. The coverage of the total code may further be determined in the same way but looking at all possible modules, with all possible functions and all possible response codes.

In another embodiment, code may be grouped into multiple levels: for example, classes, methods, and functions. Data from each level may be aggregated into the higher level.

Missing code paths (i.e. functions or response codes) that are listed in the definitive list of metadata codes but are not recorded in the trace codes may be analyzed 208 to provide feedback about missing tests that may be required to be performed.

At a basic level, the method may look at functions and the response codes from them. For example, a function may be READ or WRITE and responses may be OK, NOTFOUND, NOTAUTH, etc. This may be extended to include input and output values to the function and response codes. For example, the input values and output values may include options on the READ such as EXCLUSIVE with options YES or NO, to indicate the READ must get exclusive access to something.

An example is provided to illustrate the described method. Trace records are written at entry for a function, where a function may be a function, a method, or an API call. Trace records are written at exit for a function and a response code, where response codes may be in the form of one or more of return codes, reason codes, and exceptions. Metadata is retrieved that lists all functions with response codes. The functions may describe their place in a hierarchy with higher levels in the source code.

The following general terminology is used for trace records:

Entry: Function; and
Exit: Function; response code.

For an example of an application programming interface (API), the metadata may be a documented list of functions and the trace records may be of the form:

Entry: API name;
Exit: API name, return code.

For an example in IBM CICS, the metadata may be the API description, CDURUN, and the trace records may be of the form:

Entry: Domain, gate, function;
Exit: Domain, gate, function, return code, response code.

For an example in Java, the metadata may be a Javadoc or a scan of code and the trace records may be of the form:

Entry: API name;
Exit: API name, return code.

IBM CICS terminology is used in the following example. The hierarchy of levels in the source code are provided by Domain/Gate/Function and the metadata is the list of CDU-RUNs and their contents.

In this example, the gate "Business Application Container" (BACR) of the domain of "Business Application" (BA) is tested.

Example trace data may be obtained as follows:
BA/BACR/DELETE_CONTAINER/OK
BA/BACR/DELETE_CONTAINER/
    CONTAINER_NOT_FOUND
BA/BACR/GET_CONTAINER_INTO/OK
BA/BACR/GET_CONTAINER_SET/OK
BA/BACR/PUT_CONTAINER/OK
BA/BACR/PUT_CONTAINER/INVALID_CONTAINER_NAME
BA/BACR/COPY_CONTAINER/OK The finite list of metadata codes for the functions of the gate BACR is as follows:
BA/BACR/DELETE_CONTAINER/OK
BA/BACR/DELETE_CONTAINER/
    CONTAINER_NOT_FOUND
BA/BACR/DELETE_CONTAINER/
    CONTAINER_READONLY
BA/BACR/DELETE_CONTAINER/INVALID_CONTAINER_NAME
BA/BACR/GET_CONTAINER_INTO/OK
BA/BACR/GET_CONTAINER_INTO/
    CONTAINER_NOT_FOUND
BA/BACR/GET_CONTAINER_SET/OK
BA/BACR/GET_CONTAINER_SET/
    CONTAINER_NOT_FOUND
BA/BACR/PUT_CONTAINER/OK
BA/BACR/PUT_CONTAINER/INVALID_CONTAINER_NAME
BA/BACR/GET_CONTAINER_LENGTH/OK
BA/BACR/GET_CONTAINER_LENGTH/CONTAINER_NOT_FOUND
BA/BACR/MOVE_CONTAINER/OK
BA/BACR/MOVE_CONTAINER/CONTAINER_NOT_FOUND
BA/BACR/MOVE_CONTAINER/
    CONTAINER_READONLY
BA/BACR/COPY_CONTAINER/OK
BA/BACR/COPY_CONTAINER/CONTAINER_NOT_FOUND
BA/BACR/COPY_CONTAINER/
    CONTAINER_READONLY Comparing the trace data with the metadata has the following results with the trace codes shown in bold.
BA/BACR/DELETE_CONTAINER/OK
BA/BACR/DELETE_CONTAINER/
    CONTAINER_NOT_FOUND
BA/BACR/DELETE_CONTAINER/
    CONTAINER_READONLY
BA/BACR/DELETE_CONTAINER/INVALID_CONTAINER_NAME
BA/BACR/GET_CONTAINER_INTO/OK
BA/BACR/GET_CONTAINER_INTO/
    CONTAINER_NOT_FOUND
BA/BACR/GET_CONTAINER_SET/OK
BA/BACR/GET_CONTAINER_SET/
    CONTAINER_NOT_FOUND
BA/BACR/PUT_CONTAINER/OK
BA/BACR/PUT_CONTAINER/IN VALID_CONTAINER_NAME
BA/BACR/GET_CONTAINER_LENGTH/OK
BA/BACR/GET_CONTAINER_LENGTH/CONTAINER_NOT_FOUND
BA/BACR/MOVE_CONTAINER/OK
BA/BACR/MOVE_CONTAINER/CONTAINER_NOT_FOUND
BA/BACR/MOVE_CONTAINER/
    CONTAINER_READONLY
BA/BACR/COPY_CONTAINER/OK
BA/BACR/COPY_CONTAINER/CONTAINER_NOT_FOUND
BA/BACR/COPY_CONTAINER/
    CONTAINER_READONLY Coverage results at function level are therefore as follows:

| | | |
|---|---|---|
| BA/BACR/DELETE_CONTAINER | 2 covered out of 4 | 50% |
| BA/BACR/GET_CONTAINER_INTO | 1 covered out of 2 | 50% |
| BA/BACR/GET_CONTAINER_SET | 1 covered out of 2 | 50% |
| BA/BACR/PUT_CONTAINER | 2 covered out of 2 | 100% |
| BA/BACR/GET_CONTAINER_LENGTH | 0 covered out of 2 | 0% |
| BA/BACR/MOVE_CONTAINER | 0 covered out of 3 | 0% |
| BA/BACR/COPY_CONTAINER | 1 covered out of 3 | 33% |

Coverage results may be aggregated at method level. In this case for gate BACR the coverage is:
BA/BACR 7 covered out of 18 39%

Coverage results may be aggregated at class level. In this case for domain BA the coverage is:

| | | |
|---|---|---|
| BA | 27 covered out of 96 | 28% |

Coverage results may be aggregated at program level. In this case for the CICS code the coverage is:

| | | |
|---|---|---|
| CICS | 564 covered out of 7812 | 7% |

The described method and system use trace data to collect code coverage information. Trace data provides the actual path taken and not just an external view. This has the benefit that no tooling is required. As code coverage is determined from a trace, it does not require any instrumentation.

The code coverage used here is a measure of which functions have been executed and what possible outputs have been returned and it does not matter how long those paths are. This is better aligned to code and test complexity.

Figure 3:
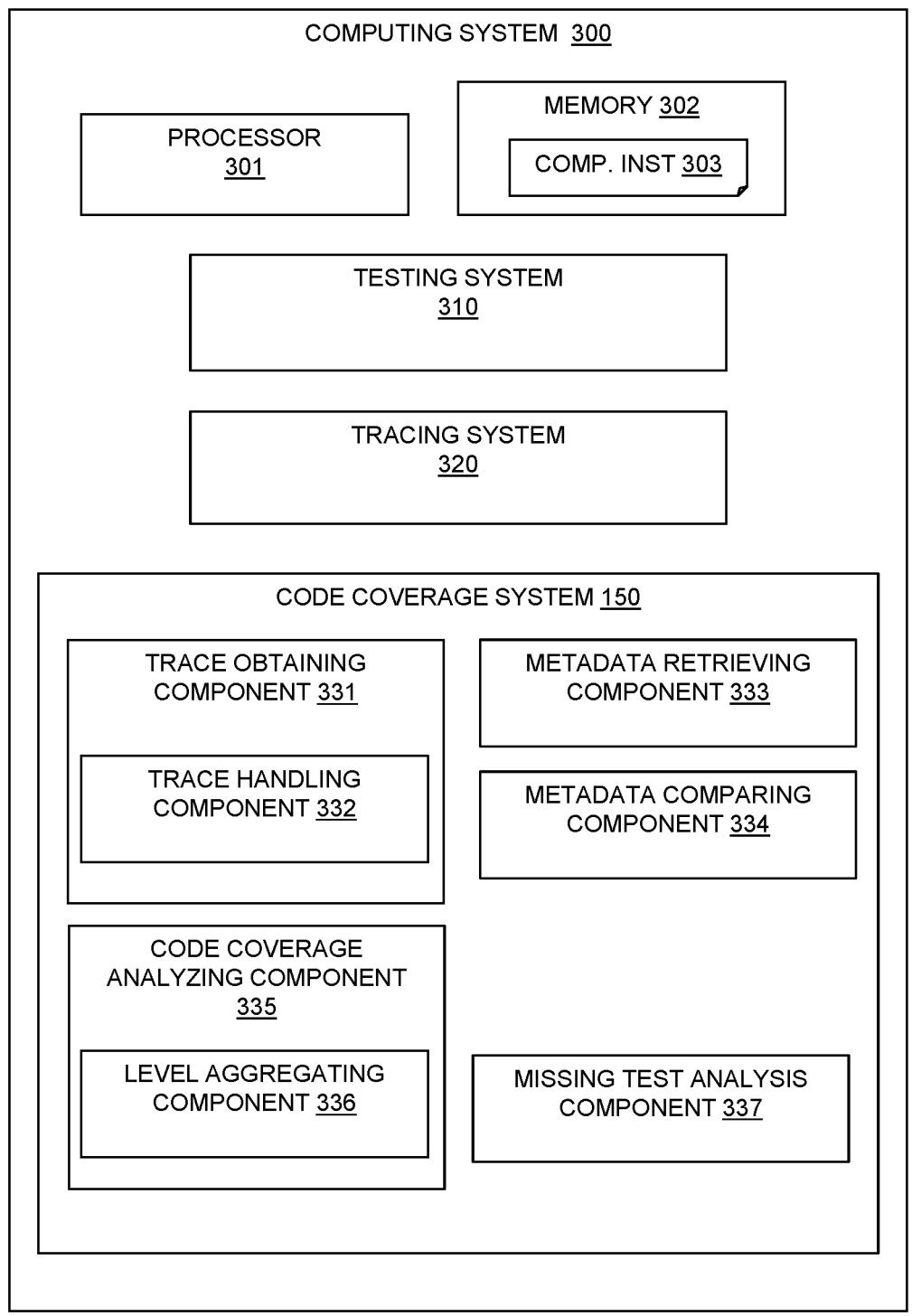
FIG. 3 is block diagram of an example embodiment of a system in accordance with the present invention.

Referring to FIG. 3, a block diagram shows an example embodiment of the described code coverage system 150 provided at a computing system 300. The computing system 300 or a separate computing system may also include a testing system 310 and a tracing system 320 that are run in conjunction with or incorporated with the code coverage system 150.

The computing system 300 includes at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The code coverage system 150 may include a trace obtaining component 331 for obtaining a trace with trace records written at entry and exit to one or more test modules for function calls to the test modules. The trace obtaining component 331 may obtain trace records where a test module calls another test module as part of its execution of a function call.

The trace obtaining component 331 may include a trace handling component 332 for pairing up entry and exit trace records to generate trace records, sorting the trace records, and removing duplicate trace records.

The code coverage system 150 may include a metadata retrieving component 333 for and a metadata for retrieving metadata for the source code for the functions and a metadata comparing component 334 for comparing response codes for the functions extracted from the trace with a finite list of response codes retrieved from metadata for the source code for the functions. The metadata comparing component 334 may provide a proportion of the metadata response codes provided in the trace records.

The code coverage system 150 may include a code coverage analyzing component 335 for analyzing a code coverage based on the comparison results of the metadata comparing component 334. The code coverage analyzing component 335 may include a level aggregating component 336 for grouping the functions into higher levels and aggregating the code coverage for each level into higher level analysis. A higher level may be a module aggregating all possible functions and all possible response codes for each function. A further higher level may be a total source code aggregating all possible modules. Alternatively, a higher level may be a higher level of a function hierarchy.

The code coverage system 150 may include a missing test analysis component 337 for analyzing response codes of the metadata that are missing from the trace records to provide feedback relating to required tests.

Figure 4:
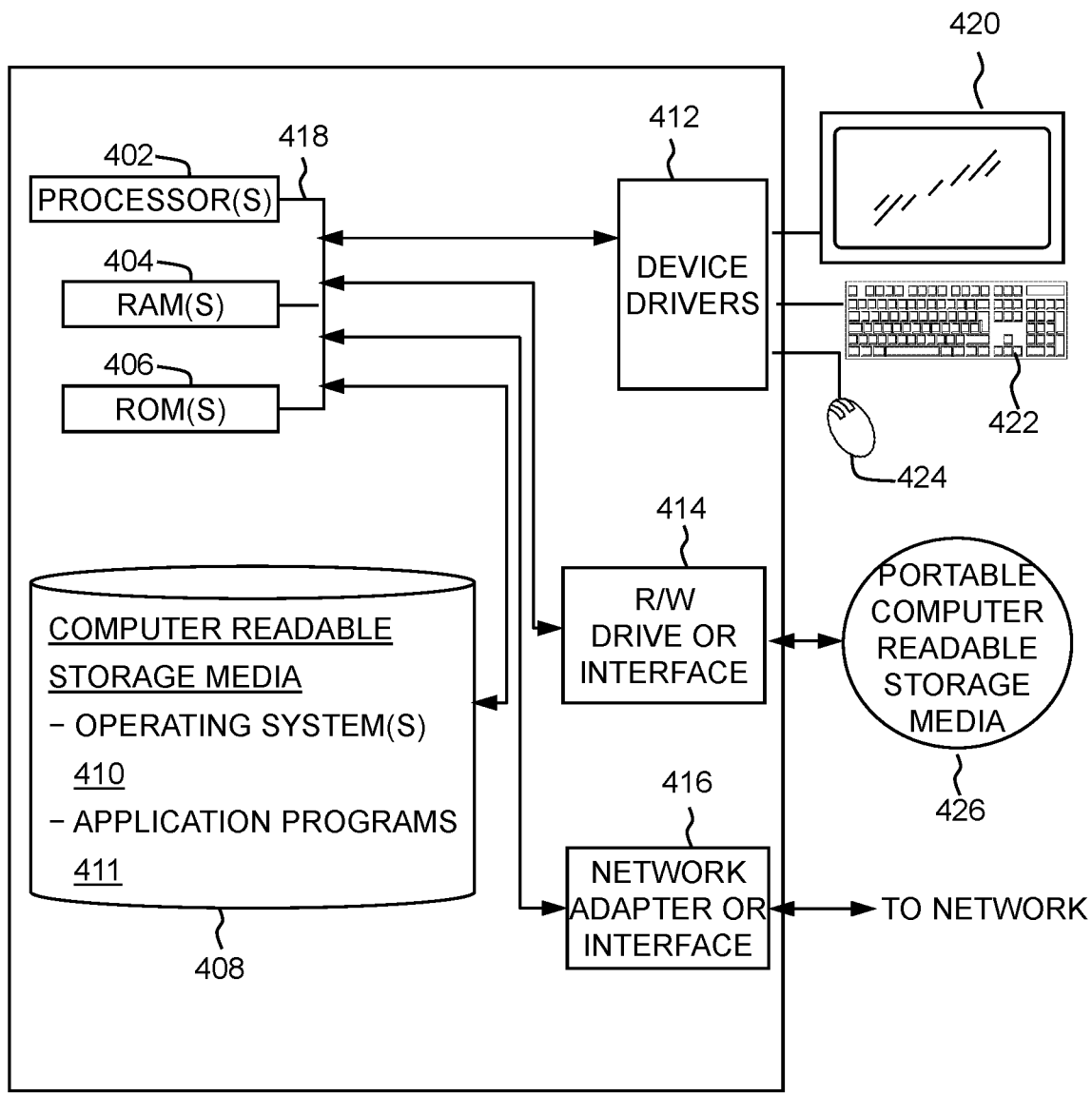
FIG. 4 is a block diagram of an embodiment of a computer system or cloud server in which the present invention may be implemented.

FIG. 4 depicts a block diagram of components of a computing system 300 as used for the code coverage system 150, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

The computing system can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410, and application programs 411, such as the code coverage system 150 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 414 to read from and write to one or more portable computer readable storage media 426. Application programs 411 on the computing system can be stored on one or more of the portable computer readable storage media 426, read via the respective R/W drive or interface 414 and loaded into the respective computer readable storage media 408.

The computing system can also include a network adapter or interface 416, such as a TCP/IP adapter card or wireless communication adapter. Application programs 411 on the computing system can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

The computing system can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
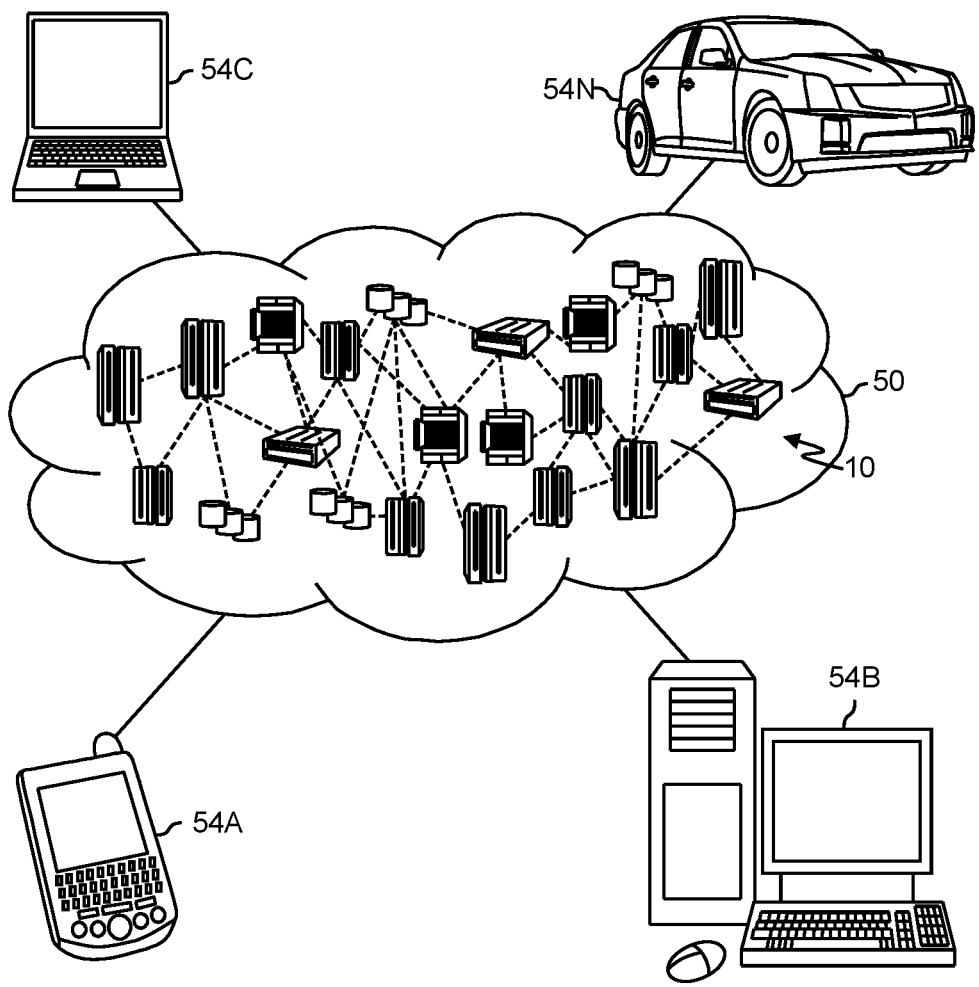
FIG. 5 is a schematic diagram of a cloud computing environment in which the present invention may be implemented.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
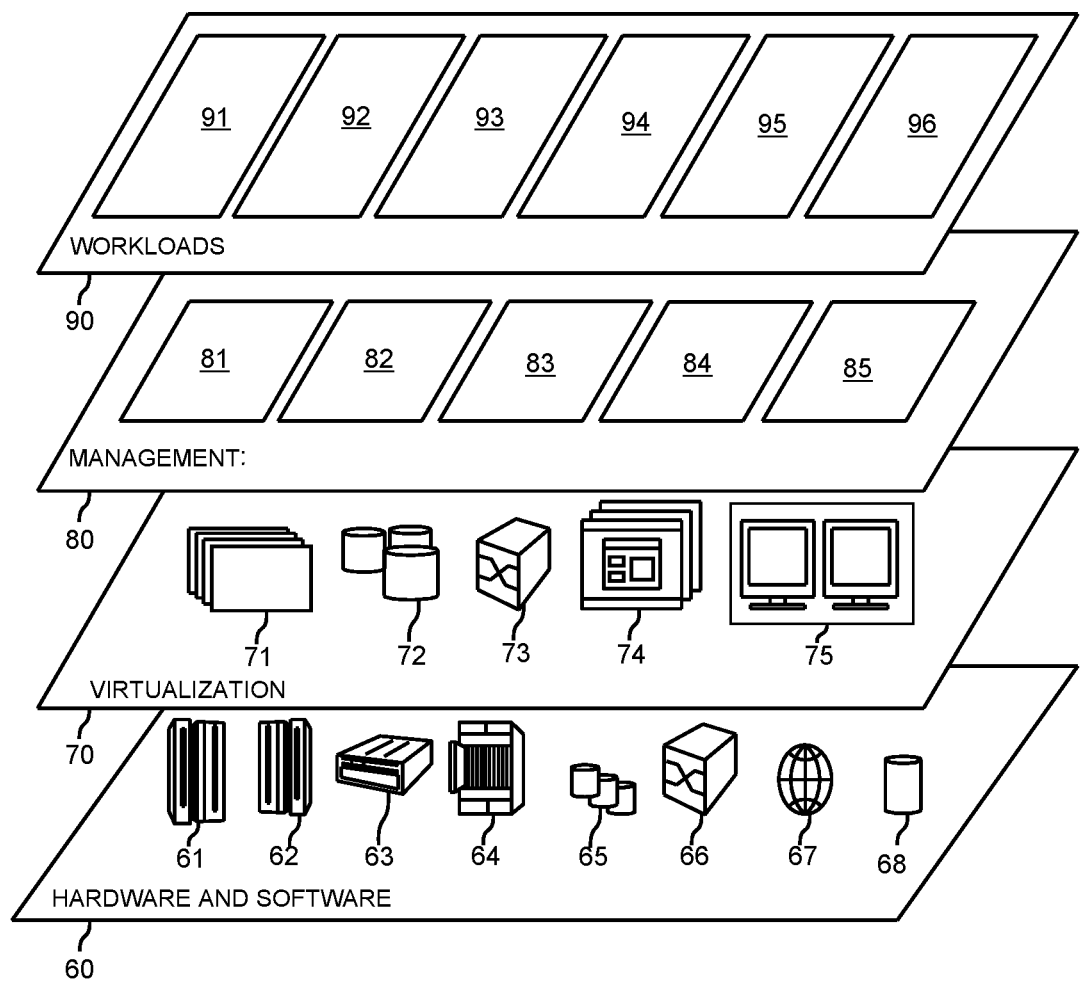
FIG. 6 is a diagram of abstraction model layers of a cloud computing environment in which the present invention may be implemented.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and code coverage processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for improved source code testing using trace data to generate code coverage information, the method comprising:
    obtaining existing trace records written at entry and exit to one or more test modules for each of one or more function calls to the test modules from a testing system and a tracing system, wherein the testing system and the tracing system are run separately from a code coverage system;
    pairing the obtained entry and exit trace records to produce a single continuous trace record, wherein the single continuous trace record comprises all input and output function calls for each of the test modules and response codes for each of the function calls, and wherein the response codes comprise return codes for successful function calls and reason codes for failed function calls, using the code coverage system;
    comparing the single continuous trace record with metadata codes of all response codes for each of one or more functions in each of the one or more test modules that have been executed by the tested code to determine a code coverage, using the code coverage system;
    analyzing the code coverage based on the comparison to determine one or more missing code paths, using the code coverage system; and
    analyzing the determined one or more missing code paths to provide feedback related to one or more missing tests to perform to increase the code coverage, using the code coverage system.

2. The method as claimed in claim 1, wherein comparing the response codes for the function calls with the response codes retrieved from the metadata provides a proportion of the metadata response codes provided in the existing trace records.

3. The method as claimed in claim 1, wherein analyzing the code coverage includes:
    grouping the functions into higher levels and aggregating the code coverage for each level into higher level analysis.

4. The method as claimed in claim 3, wherein a higher level is a module aggregating all possible functions and all possible response codes for each function.

5. The method as claimed in claim 4, wherein a higher level is a total source code aggregating all possible modules.

6. The method as claimed in claim 3, wherein a higher level is a higher level of a function hierarchy.

7. The method as claimed in claim 1, wherein the response codes for the function calls and the response codes retrieved from the metadata include one or more of the group of: successful return codes; unsuccessful reason codes, and exceptions.

8. The method as claimed in claim 1, wherein a test module calls another test module as part of its execution of a function call.

9. A computer system for improved source code testing using trace data to generate code coverage information, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    obtaining existing trace records written at entry and exit to one or more test modules for each of one or more function calls to the test modules from a testing system and a tracing system, wherein the testing system and the tracing system are run separately from a code coverage system;
    pairing the obtained entry and exit trace records to produce a single continuous trace record, wherein the single continuous trace record comprises all input and output function calls for each of the test modules and response codes for each of the function calls, and wherein the response codes comprise return codes for successful function calls and reason codes for failed function calls, using the code coverage system;
    comparing the single continuous trace record with metadata codes of all response codes for each of one or more functions in each of the one or more test modules that have been executed by the tested code to determine a code coverage, using the code coverage system;
    analyzing the code coverage based on the comparison to determine one or more missing code paths, using the code coverage system; and
    analyzing the determined one or more missing code paths to provide feedback related to one or more missing tests to perform to increase the code coverage, using the code coverage system.

10. The system as claimed in claim 9, wherein the analyzing of the code coverage based on the comparison provides a proportion of the metadata response codes provided in the existing trace records.

11. The system as claimed in claim 9, wherein the analyzing of the code coverage based on the comparison includes:
    grouping the functions into higher levels and aggregating the code coverage for each level into higher level analysis.

12. The system as claimed in claim 11, wherein a higher level is a module aggregating all possible functions and all possible response codes for each function.

13. The system as claimed in claim 12, wherein a higher level is a total source code aggregating all possible modules.

14. The system as claimed in claim 11, wherein a higher level is a higher level of a function hierarchy.

15. The system as claimed in claim 9, wherein the obtaining of the existing trace records written at the entry and the exit to the one or more test modules for the function calls to the test modules comprises obtaining existing trace records where a test module calls another test module as part of its execution of a function call.

16. A computer program product for improved source code testing using trace data to generate code coverage information, the computer program product comprising:

one or more computer-readable tangible storage medium and program instructions stored on at least one of the one or more tangible storage medium, the program instructions executable by a processor to cause the processor to perform a method comprising:

obtaining existing trace records written at entry and exit to one or more test modules for each of one or more function calls to the test modules from a testing system and a tracing system, wherein the testing system and the tracing system are run separately from a code coverage system;

pairing the obtained entry and exit trace records to produce a single continuous trace record, wherein the single continuous trace record comprises all input and output function calls for each of the test modules and response codes for each of the function calls, and wherein the response codes comprise return codes for successful function calls and reason codes for failed function calls, using the code coverage system;

comparing the single continuous trace record with metadata codes of all response codes for each of one or more functions in each of the one or more test modules that have been executed by the tested code to determine a code coverage, using the code coverage system;

analyzing the code coverage based on the comparison to determine one or more missing code paths, using the code coverage system; and analyzing the determined one or more missing code paths to provide feedback related to one or more missing tests to perform to increase the code coverage, using the code coverage system.

* * * * *